GARLAND & MORGAN.
Tire-Tightener.

No. 67,187.               Patented July 30, 1867.

Witnesses:
Guy C. Humphries
Charles Herron.

Inventor:
William J. Garland
Nelson Morgan
by
D. E. Jones & Co
their Attorneys

United States Patent Office.

WILLIAM J. GARLAND AND NELSON MORGAN, OF WINCHESTER, ILLINOIS.

Letters Patent No. 67,187, dated July 30, 1867.

---

IMPROVEMENT IN ADJUSTING TIRES TO WHEELS.

---

The Schedule referred to in these Letters Patent and making part of the same.

---

TO ALL WHOM IT MAY CONCERN:

Be it known that we, WILLIAM J. GARLAND and NELSON MORGAN, of Winchester, in the county of Scott, and in the State of Illinois, have invented an Improvement in Adjusting Tire to Wheels; and we do hereby declare that the following is a full, clear, and exact description thereof, reference being had to the annexed drawings making part of this specification, in which—

Figure 1 is an elevation of a portion of the rim of a wheel with a part,

Figure 2, detached.

The nature of our invention consists in so constructing the tire that it may be drawn tight upon the felloes after becoming loose by stretching from wear, or the shrinking of the felloe, without removing the wheel from the vehicle, and in preserving the continuity of the felloe or wooden rim of the wheel so that its power to resist a tendency to spring may not be impaired by cutting through it, as is the case in all other plans that have been hitherto devised for the same end.

Figure 1:
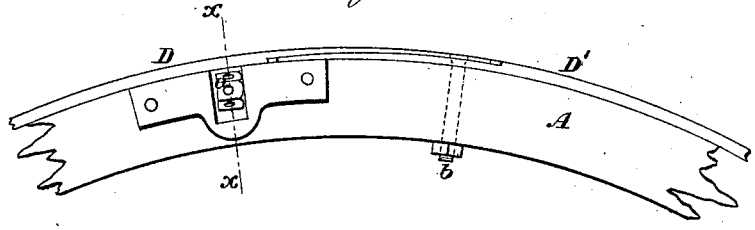
Figure 2:
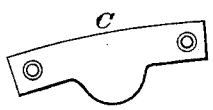
Figure 4:
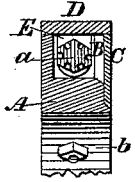
Figure 4 is a cross-section of the line X X of fig. 1.
Figure 3:
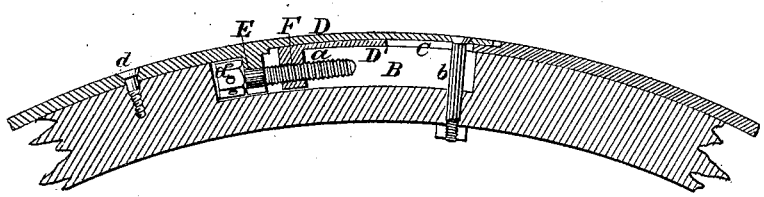
Figure 3 is a section through the centre of the wheel, in a plane at right angles with the axis thereof.
Figure 5:
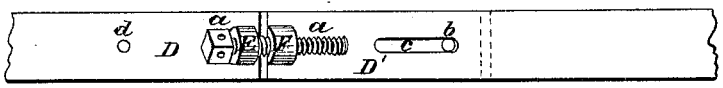
Figure 5 is a view of that side of the tire which lies on and next to the felloes.

In the drawings, A A is the wooden rim or felloe of the wheel, having a chamber or groove, B, cut into it, as seen in figs. 3 and 4. This chamber has at one end an opening of communication, through the side of the felloe, which is covered by the plate C, shown detached in fig. 2, and in place in fig. 4; the bed for it in the side of the felloe being sunken so that the plate may be flush with the felloe. D D' is the tire, divided, and having its ends lapped one upon the other, as shown. Attached to the under side of the upper or overlapping end D of the tire, and forming one piece with it, is a lug, E, having a hole to receive the shank of a screw, $a$, which turns freely in it. On the under side of the lower or underlapping end D' of the tire is a similar lug, F, which is tapped to receive the threads of the screw $a$. The lugs E F and screw $a$ are received by the chamber B, and are completely enclosed therein; the head of the screw having holes whereby it can be turned, the wrench being inserted through the opening into the chamber B, after the plate C has been removed for the purpose. The end D of the tire has a square or other suitably-shaped countersunk hole for the head of a bolt, $b$, which passes through it and through the slot $c$ in the end D' of the tire, and then through the felloe, where it is secured by a nut, (see fig. 3.) Another screw, $d$, secures the end D to the felloe, so that this end is unchanged in its relation to the felloe, while the slot $c$ permits the end D' to move without being impeded by the bolt $b$. The head of the screw $a$ may be locked, so as to prevent it from being turned by the jar of the wheel, by the introduction of a key-plate between one of its faces and the tire, or the bottom of the chamber B, or the plate C, or all of them, or by any device known to mechanics.

Having thus fully described our invention, what we claim therein as new, and desire to secure by Letters Patent, is—

The arrangement of the tire D D', with its lugs E and F, screw $a$, bolt $b$, and slot $c$, substantially as described, in combination with a continuous felloe. A, and its chamber B, constructed substantially as and for the purpose set forth.

In testimony that we claim the above-described improvements in adjusting tire to wheels, we have hereunto signed our names this 30th day of April, 1867.

WILLIAM J. GARLAND,
NELSON MORGAN.

Witnesses:
W. C. WILKINSON,
WILLIAM H. TAFTS.